Nov. 19, 1935.  W. W. EMMONS  2,021,594
TERMINAL BOX FOR ELECTRIC CABLES
Filed June 24, 1933  2 Sheets-Sheet 2
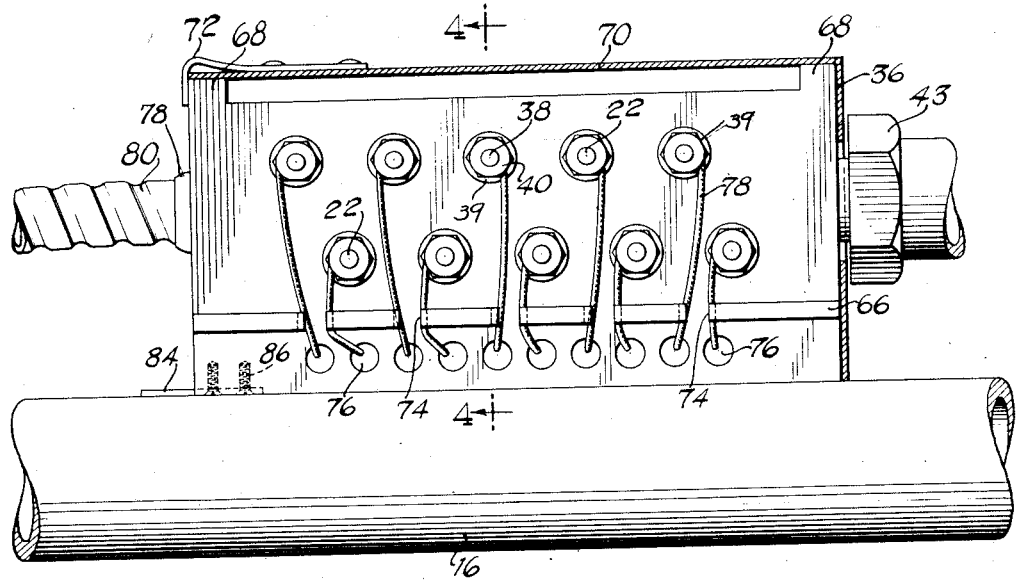
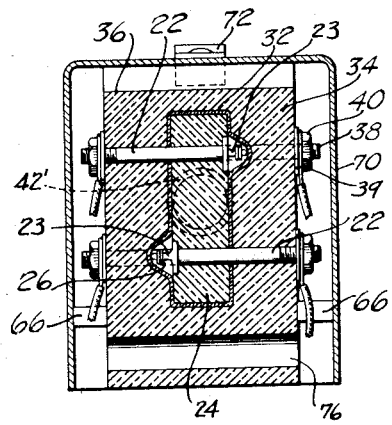
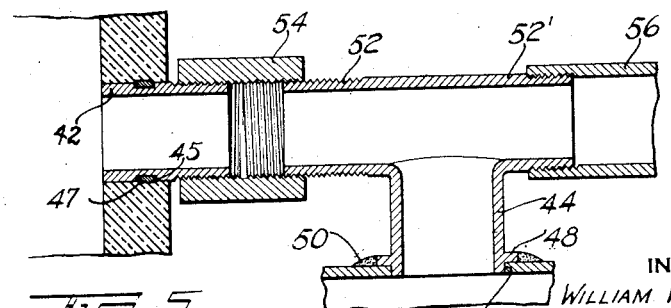
INVENTOR
WILLIAM W. EMMONS.
BY
Dyke and Schaines
ATTORNEYS.

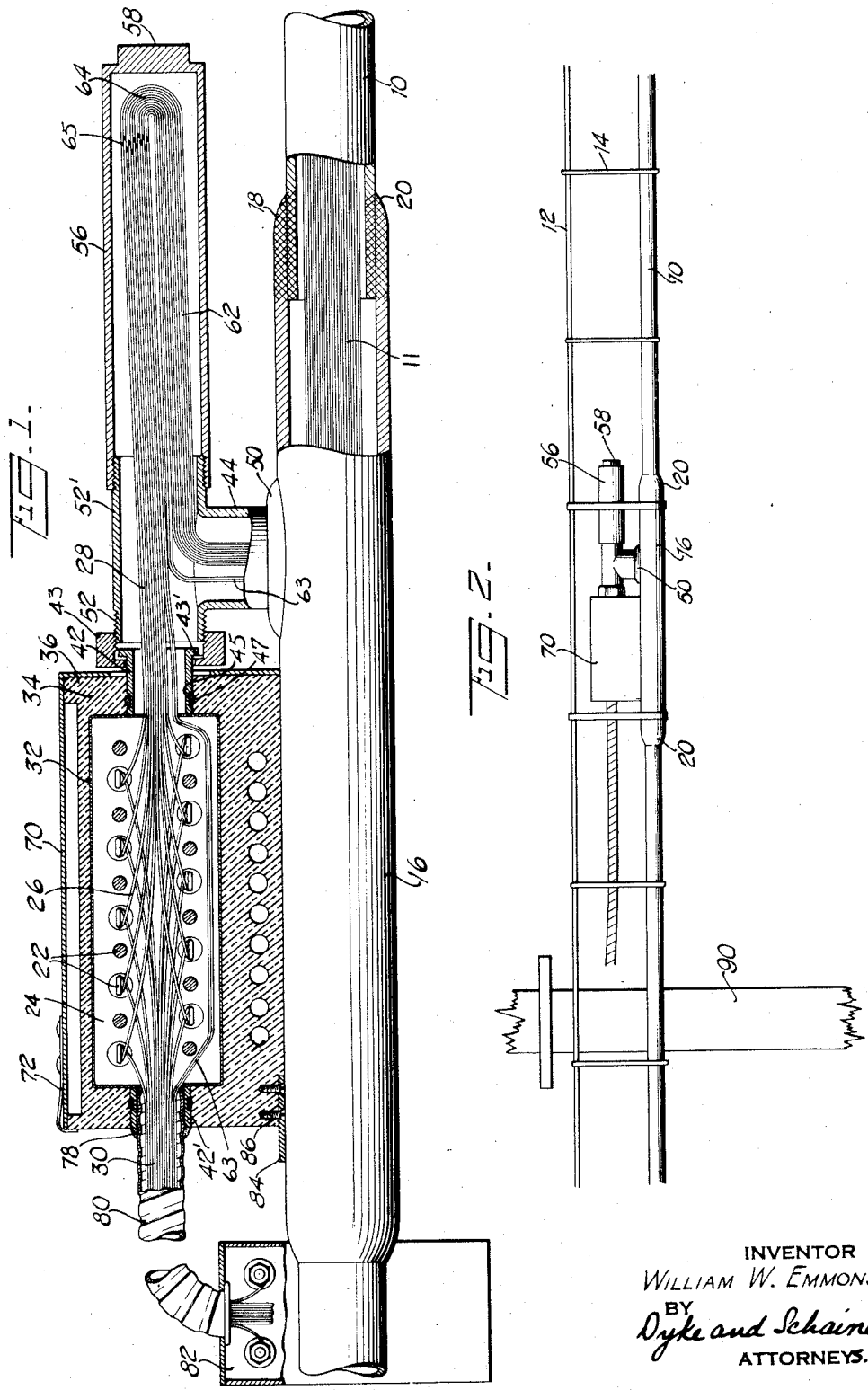

Patented Nov. 19, 1935

2,021,594

UNITED STATES PATENT OFFICE 2,021,594

TERMINAL BOX FOR ELECTRIC CABLES

William W. Emmons, East Orange, N. J.

Application June 24, 1933, Serial No. 677,356

10 Claims. (Cl. 247—7)

My invention relating to terminal boxes for electric cables, and the connections therebetween, comprises improvements upon my U. S. Patent No. 1,680,940, granted August 14, 1928, and my U. S. Patent No. 1,917,242, granted July 11, 1933, and has for its main object the provision of a terminal box or block in which the lead-out wires and their connections are permanently, positively and hermetically sealed therewithin; the connections to and from which are easy of access; and which is of such construction as to be readily mounted with respect to electric cables.

A further object of my invention is to mount my improved terminal box or block with respect to the cable to which it is connected, in such manner that the same will comprise a rigid, unitary construction.

It is a further object of my invention to provide a terminal box or block which is so light and compact that its weight will be no material addition to the cable burden and the same may be carried on top of the cable and between it and the wire or the like from which the cable sheath is supported.

I will describe my invention as applied to a telephone cable, although the same is not so limited, and is capable of other applications.

For maximum operating efficiency in connection with telephone circuits, for example, it is desirable that superatmospheric pressure be maintained within the telephone and other electric-wire carrying cable and conduits, and all leakage therefrom avoided; the presence of the standard gauge pressure ordinarily affording a sufficient indication that all is well. Terminal boxes are exposed to adverse weather and storm conditions, and the connections between these boxes and the cables on which they are mounted are subject to consequent distortion and breaks. Distortions and breaks cause leakage, and are productive of costly delays in connection with replacements and repairs. In accordance with my invention, the terminal box is mounted with respect to the cable in such manner that the whole forms a rigid, unitary assembly, with little or no room for sway and distortion between the various components, thereby reducing breaks and leaks to the minimum.

In the drawings illustrating an embodiment of my invention:

Figure 1 is a longitudinal section through the terminal box or block of my invention and its connections to the cable;

Fig. 2 is an elevation of the complete terminal box or block mounted on and connected to the cable;

Fig. 3 is a side elevation of the terminal box or block with the side of the cover removed;

Fig. 4 is a section of the terminal box or block on the line 4—4 of Fig. 3; and

Fig. 5 is an enlarged section of an alternative connection between the T-member and the terminal box or block.

Cable sheath 10, within which are contained the electric current carrying wires 11, is suspended from support wire 12 by means of stirrups 14. A portion of sheath 10 is cut away at that point where the terminal box or block is to be mounted, and sleeve member 16, of diameter slightly larger than that of the sheath 10, is inserted with the ends 18 thereof overlapping the spaced apart ends of the cable sheath 10. The sheath and sleeve ends are soldered together, and a wiped joint made therearound, as at 20.

The terminal box or block 36 is preformed and is mounted on sleeve 16, as described below. The box or block of my invention is prepared in the following manner: A number of terminal posts 22 are forced through holes formed in a core strip 24 of fibrous or other insulating material, from opposite sides of said strip, and arranged at fixed, preferably uniform, distances apart (Fig. 4). Electric current conducting wires 26, with their insulation covering removed at the point of connection to the posts, are attached to one end 23 of said posts 22, and disposed with the free ends 28 and 30 thereof projecting beyond the respective ends of the strip 24. The wires 26 are carefully spaced apart from each other to avoid short circuiting, and around and about the entire assembly, consisting of strip 24, posts 22 and wires 26, a sheet 32 of rubber or rubberized fabric is tightly wound, in manner to maintain the fixed wire disposition and spacing when the terminal box or block itself is formed thereabout within a mold.

The fiber strip 24, with the ends 38 of posts 22 projecting through sheathing 32, and from both sides thereof, is set within a suitable mold (not shown), and plastic material 34, such as bakelite, for example, is introduced into the mold around the strip, and the box or block 36 formed, in manner suited to the particular molding material, but in any case under tremendously high pressure. The sheathing material 32 serves to maintain the disposition and fixed spacing between the wires, under the high pressure applied in forming the box or block, and also serves as gasketing material to preserve fluid- and airtightness within the same. Ends 38 of the terminal posts 22 are threaded, and project outwardly beyond both sides of the terminal block or casting 36, suitable provision therefor being provided in the mold. Washers 39 and nuts 40 are applied in order to secure lead-out connection wires to the terminals.

Nipples 42 and 42', of suitable metallic material, such as brass, and having the free ends 28 and 30, respectively, of wires 26 passed out therethrough, are also set within the mold, and are molded within and as a part of the box casting 36 at opposite ends of the strip 32. The rubber sheathing 32 is not disposed around these nipples, but circumferential grooves 45 are formed in that portion of the nipples 42 and 42' within the body of molded material, and an insert 47, of compressible material such as rubber or the like, is placed within the groove, to take up any differences in expansion and contraction between the molded member 36 and metallic members 42, 42', thus maintaining the fluid- and air-tight seal within the construction. Inserts 47 may be secured within grooves 45, against displacement therefrom, during the block forming operation, as by means of a wire (not shown) or in other ways. The ends of the nipples within the box, block or casting 36 abut tightly against the fiber strip 24.

The nipple 42 is secured to T-member 44 of suitable metallic material, such as brass. The standing part of T-member 44 is received and soldered within a suitable opening 46 in sleeve 16 (Fig. 5). A peripheral shoulder flange 48 is provided to limit the extent to which the standing part can be inserted within opening 36. The two metallic members 16 and 46 are fused together at 50, or a solder joint may be wiped therearound, or the same may be secured in other ways. The arms 52, 52' of T-member 44 are provided with male threads, and the connection of one arm 52 thereof to nipple 42 may be made either by union 43, as in Figures 1 and 3, in which case nipple 42 is provided with a flange or external shoulder 43' (Fig. 1), or by a right and left female threaded nipple 54, as shown in Figure 5, suitable gasketing (not shown) being provided to maintain the seal within the connections. The other arm 52' of T-member 44 is adapted to have threaded thereon an elongated cap or splicing chamber 56 which is provided with extension nut portion 58 for facilitating the removal and replacement of the same.

Wires 11 are tapped in the vicinity of the sleeve insert and the connecting wires 62 are passed through opening 46 in sleeve 16, through the body of T-member 44, and through arm 52' of said T-member, respectively. The free ends of wires 62 are secured to ends 28 of wires 26 projecting from terminal box 36, and the circuit from the cable to the box completed. The connected ends 64 or "pigtail" of wires 62 and 26 are contained in splicing chamber 56 for purposes of quick and easy access in connection with repairs or replacements, the extra length thereof being necessary in making the proper connections.

It is not necessary that each of the outlet wires connected to wires within cable 10 be secured to a terminal post in box casting 36, and for certain purposes wires such as 63 may be led out from the cable 10, through T-member 44, and chamber 56, through box casting 36, and out through nipple 42' for a direct connection, without any intermediate connection to the terminal posts set within the box.

Studs 66 are formed on each side of the casting 36, spaced to extend beyond ends 38 of the terminal posts, so that casing cover 70, adapted to fit over box 36 as a weather shield, will not foul and short circuit any of the connections. Projections 68 are provided on the top and at each end of box 36, extending upwardly therefrom, and one thereof serves as a detent for hook 72 provided on cover 70 to engage same to keep the cover in place and prevent direct access of wind and weather to the terminal connections. The cover 70 consists of an inverted U-shaped casing, with an apertured end wall through the opening wherein the nipple 42 extends and is spaced away from the body of the casting 36 by the studs 66 and 68, and with troughs 74 cut through shoulders 66, and holes 76 drilled through the bottom of casting 36, so that convenient passageways are provided for the connection wires to and from the terminal box.

From the above description of a device embodying my invention, it is obvious that connections for house circuits are thus made available at two points on the terminal box; at the posts 22 extending outwardly from both sides thereof and at the ends 30 of the wires extending from nipple 42'.

A flexible sheathing 80, of metallic material, is soldered to nipple 42' as at 78 and leads to box or block 82 similar in nature to box or block 36, secured to a pole such as 90 or to a building, etc., from which point the direct connection to the service-subscriber is made, so that all possibilities of movement of any of the parts with respect to others and consequent distortion and leakage will be minimized.

Box or block 36 is secured to sheath 10 at two points; at one end thereof, nipple 42 is joined to T 44, which in turn is soldered to or fused with sheath 10, and at the other end, a lug 84 of metal is fastened by one end to box or block 36 by screws 86 with the free end thereof projecting beyond the edge of the box and soldered to or fused with sleeve 16. The terminal box is thus rigidly and immovably fastened to sheath 16, forming a unit therewith, and will not be subject to any distortion between any of the components thereof.

After any new connections are made, or repairs effected, necessitating the removal of the splicing chamber or of any of the connections, the superatmospheric pressure is restored within the cable sheath, the hermetic seal reestablished, and, finally, the circuit "reloaded" and restored in operation.

Having described my invention, what I claim and desire to secure by Letters Patent is:

1. A terminal box or block for electric cables comprising a core, a plurality of current conducting means seated therein, and a body of insulating material molded therearound, means within the body of insulating material connected to one end of each of said first-named means to conduct electrical current thereto, the other end of said first named means projecting from the lateral sides of the molded box or block and providing an outlet connection therefrom.

2. A terminal box for electric cables comprising a centrally located core, a plurality of current conducting means passed therethrough and secured thereto, comprising terminal posts which project from both sides of said core in unequal amounts, means to conduct current thereto connected to the shorter of said projections, and a body of insulating material molded therearound, the longer of said projections providing means to conduct current from said first named means, and the ends of said longer projections projecting beyond the body of molded insulating material.

3. A terminal box for electric cables comprising a centrally located core, a plurality of current conducting means seated thereon to one end of each of which is connected means to conduct electrical current thereto, the other end of said first named means providing outlet connections, and a body of insulating material molded therearound, said second named means passing longitudinally through said box and connected to said first named means at a point within the said body of molded material.

4. A terminal box for electric cables comprising a core, a plurality of current conducting means seated thereon to one end of each of which is connected means to conduct electrical current thereto, a body of insulating material molded therearound, the other end of each of said first named means providing an outlet connection projecting through the body of molded material, and a compressible member between said core and said insulating material.

5. A terminal box for electric cables comprising a centrally located core, a plurality of current conducting means passing therethrough and secured thereto comprising terminal posts which project from both sides of said core in unequal amounts, a body of insulating material molded therearound, and a member of compressible material disposed between said body of insulating material and said core, means to conduct current thereto connected to the shorter of said sides within the body of molded material and between the core and the member of compressible material, said shorter side being contained wholly within the body of molded material, the longer of said sides providing means to conduct current from said first named means, the ends thereof projecting beyond the body of plastic material.

6. A terminal box for electric cables comprising a core, nipples at each end thereof, a plurality of current conducting means seated thereon to one end of each of which is connected means to conduct electrical current thereto passing through said nipples, a body of insulating material molded therearound, the other end of each of said first named means providing an outlet connection and projecting from the sides and beyond said body of molded material.

7. A terminal box for electric cables comprising a core, nipples at each end thereof, a plurality of current conducting means seated thereon to one end of each of which is connected means to conduct electrical current thereto passing through said nipples, a body of insulating material molded therearound, and a compressible insert between each of said nipples and said body of molded material adapted to equalize for any differences in expansion and contraction therebetween.

8. In a terminal box for electric cables, an insulating member, binding post members fixed therein, wires connected to said binding post members, sheet insulating material tightly encompassing the foregoing with the binding post members projecting therethrough, and a body of insulating material molded under pressure about the whole, the ends of said binding post members projecting through on opposite sides thereof.

9. A terminal box for electric cables comprising a core, current conducting means seated thereon, a body of insulating material molded therearound, and a compressible member between said core and said insulating material.

10. Device as in claim 9, in which the ends of the current conducting means project through both the body of insulating material and the compressible member.

WILLIAM W. EMMONS.